(12) United States Patent
Bayles et al.

(10) Patent No.: US 8,819,148 B2
(45) Date of Patent: Aug. 26, 2014

(54) ALTERNATE E-MAIL DELIVERY

(75) Inventors: Len Albert Bayles, Sandy, UT (US); Joseph Chiu Kit Yee, Toronto (CA)

(73) Assignee: Afilias Limited (IE)

( * ) Notice: Subject to any disclaimer, the term of this patent is extended or adjusted under 35 U.S.C. 154(b) by 548 days.

(21) Appl. No.: 12/721,254

(22) Filed: Mar. 10, 2010

(65) Prior Publication Data

US 2011/0225246 A1  Sep. 15, 2011

(51) Int. Cl.
*G06F 15/16* (2006.01)

(52) U.S. Cl.
USPC .......................................... 709/206; 709/227

(58) Field of Classification Search
USPC ......................................................... 709/206
See application file for complete search history.

(56) References Cited

U.S. PATENT DOCUMENTS

| | | | | |
|---|---|---|---|---|
| 5,781,901 | A * | 7/1998 | Kuzma | 1/1 |
| 7,454,497 | B1 * | 11/2008 | Estabrooks | 709/224 |
| 2002/0120689 | A1 * | 8/2002 | Kang et al. | 709/206 |
| 2003/0005157 | A1 | 1/2003 | Chung et al. | |
| 2003/0028647 | A1 * | 2/2003 | Grosu | 709/227 |
| 2003/0046353 | A1 * | 3/2003 | Chung et al. | 709/206 |
| 2003/0210429 | A1 * | 11/2003 | Yamashita | 358/1.18 |
| 2004/0122904 | A1 * | 6/2004 | Kim | 709/206 |
| 2005/0147069 | A1 * | 7/2005 | Rink et al. | 370/338 |
| 2006/0031579 | A1 * | 2/2006 | Tout | 709/245 |
| 2006/0036767 | A1 * | 2/2006 | Ryan | 709/245 |
| 2007/0083656 | A1 | 4/2007 | Bobo | |
| 2008/0244027 | A1 * | 10/2008 | Foulger et al. | 709/206 |
| 2009/0271283 | A1 * | 10/2009 | Fosnacht et al. | 705/26 |
| 2010/0005293 | A1 * | 1/2010 | Errico | 713/165 |

FOREIGN PATENT DOCUMENTS

WO  2005/119542 A1  12/2005

OTHER PUBLICATIONS

ISA/CA, International Search Report and Written Opinion, Jun. 30, 2011, PCT/CA2011/000262, applicant: Afilias Limited et al.

* cited by examiner

*Primary Examiner* — Brian P Whipple
*Assistant Examiner* — James Edwards
(74) *Attorney, Agent, or Firm* — Marger Johnson & McCollom, PC

(57) ABSTRACT

A method is provided for transmitting an electronic mail (e-mail) message from a sender having a non-ASCII username to a recipient. The method comprising the following steps. It is determined whether or not the recipient is configured to receive the e-mail message. If the recipient is configured to receive the e-mail message, the message is transmitted to the recipient. If the recipient is not configured to receive the e-mail message, the e-mail message is submitted for storage in a data store, a uniform resource locator (URL) to identify a location of the stored e-mail message is obtained; and a notification message, including the URL, is transmitted to the recipient. A proxy server and e-mail server for implementing the method are also provided.

20 Claims, 2 Drawing Sheets

ALTERNATE E-MAIL DELIVERY

The present invention relates generally to electronic mail (e-mail) delivery and specifically to a system and method for delivering e-mail messages from a non-ASCII e-mail address to mail user agents incapable of handling non-ASCII e-mail addresses.

BACKGROUND

With the growth of computer networks, electronic mail (e-mail) has become a popular means for both personal and professional communication. Due, in large part, to the proliferation of the Internet, e-mail has become a standard means of communication for millions of people.

A sender uses a Mail User Agent (MUA) to create an e-mail message. Examples of MUAs include client-side applications such as Microsoft Outlook and Eudora as well as web-based applications such as Hotmail and Gmail. As is well known, the sender creates the e-mail message by entering one or more e-mail addresses, a message subject, a message body and may also attach files to the message. Each e-mail address comprises two portions. A first portion is referred to as a domain of the e-mail address and references a host name or domain name. The domain is typically located to the right of the '@' sign. A second portion is referred to as a username or account name and is used to identify an e-mail account at the domain. The username is typically located to the left of the '@' sign.

The MUA transmits the e-mail message to the recipient, or recipients, via a transmission e-mail server. The transmission e-mail server includes a Mail Submission Agent (MSA) and a Simple Mail Transfer Protocol (SMTP) server. The MSA contacts a Domain Name Server (DNS) to resolve the domain name of the e-mail address and obtain a corresponding Internet Protocol (IP) address. The SMTP server uses the obtained IP address to transmit the message to a receiving e-mail server for the recipient. The e-mail message maybe transmitted directly to the receiving e-mail server or it may be relayed via a plurality of Mail Transport Agents (MTAs).

The receiving e-mail server typically includes a MTA, a local delivery agent, local file storage, and a Post Office Protocol (POP) and/or Internet Message Access Protocol (IMAP) server to allow e-mail message retrieval. The recipient uses a MUA to retrieve the e-mail message from the receiving e-mail server.

In a typical ASCII environment all of the components in the network are capable of processing an ASCII e-mail address. However, e-mail addresses in the near future may contain foreign language (non-ASCII) characters. For example, Internationalized Domain Names (IDNs) are defined as Internet domain names that can potentially include non-ASCII characters. It is envisaged that international e-mail addresses may also include IDN usernames as part of such an e-mail address. Therefore, it is possible that the IDN usernames may also include non-ASCII characters.

In order to overcome this limitation, a method has been proposed that allows ASCII-only system components to "downgrade" an IDN e-mail address. Specifically, an alternate, ASCII e-mail address is defined by a user for an IDN e-mail addresses. Accordingly, when an ASCII-only system component receives an IDN e-mail address, the e-mail address is downgraded by replacing it with the alternate, ASCII e-mail address.

Although this solution enables e-mail messages having IDN e-mail addresses to be delivered using existing network components, it requires each user to establish and maintain two different e-mail boxes.

Accordingly, it is desirable to facilitate the delivery of e-mail messages having IDN e-mail addresses across a network that may include one or more components that are compatible only with ASCII e-mail address, without the limitations of the prior art.

SUMMARY

In accordance with an aspect of the present invention there is provided a method for transmitting an electronic mail (e-mail) message from a sender having a non-ASCII username to a recipient, the method comprising the steps of: determining whether or not the recipient is configured to receive the e-mail message; if the recipient is configured to receive the e-mail message, transmitting the message to the recipient; if the recipient is not configured to receive the e-mail message: submitting the e-mail message for storage in a data store; obtaining a uniform resource locator (URL) to identify a location of the stored e-mail message; and transmitting a notification message to the recipient, the notification message including the URL.

In accordance with a further aspect of the present invention there is provided a non-transient computer readable medium having stored thereon instructions for executing the above-described method when implemented by a processor.

In accordance with yet a further aspect of the present invention there is provided a proxy e-mail server configured to display an e-mail message from a sender having a non-ASCII username to a recipient that cannot receive e-mail messages from senders non-ASCII usernames, the proxy e-mail server comprising: a data store configured to store the e-mail message from a transmission e-mail server; and a web server configured to: generate a URL to identify a location of the e-mail message; transmit the URL to the recipient; and display the e-mail message to the recipient when the recipient accesses the URL.

In accordance with yet a further aspect of the present invention there is provided an e-mail server configured to transmit an e-mail message from a sender having a non-ASCII username to a recipient, the e-mail server comprising: memory for storing instructions; and a processor, configured to execute the instructions to implement the steps of: determining whether or not the recipient is configured to receive the e-mail message; if the recipient is configured to receive the e-mail message, transmitting the message to the recipient; if the recipient is not configured to receive the e-mail message: submitting the e-mail message for storage in a data store; obtaining a uniform resource locator (URL) to identify a location of the stored e-mail message; and transmitting a notification message to the recipient, the message notification including the URL.

BRIEF DESCRIPTION OF THE DRAWINGS

Embodiments of the present invention will now be described by way of example only with reference to the following drawings in which.

DETAILED DESCRIPTION OF THE PREFERRED EMBODIMENT

Figure 1:
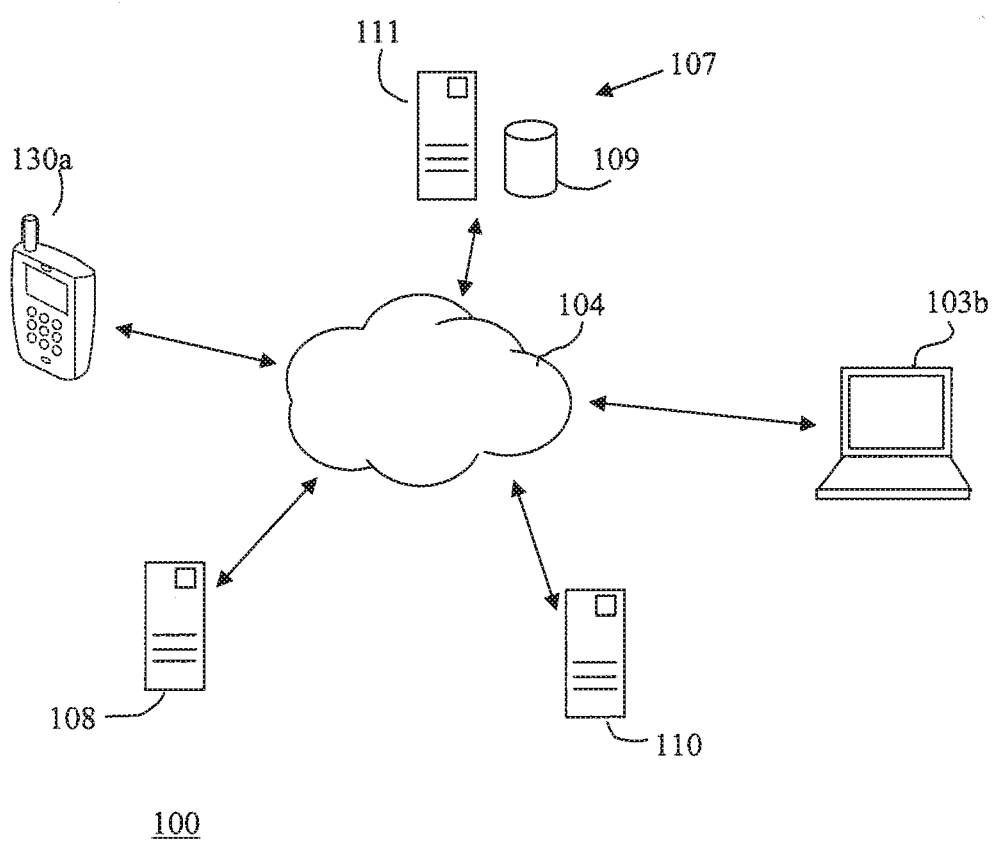
FIG. 1 is a block diagram of a sample network infrastructure.

For convenience, like numerals in the description refer to like structures in the drawings. Referring to FIG. 1, a block diagram illustrating a sample network infrastructure in accordance with the present embodiment is illustrated generally by numeral 100. The network 100 includes communication devices 103a and 103b, a transmission e-mail server 108, a communication network 104, a reception e-mail server 110, and a proxy e-mail server 107.

The communication devices 103a and 103b can be any one of a number of devices used to transmit and/or receive e-mail messages, such as a personal computer, a notebook computer, a tablet computer, a smart phone, or a personal digital assistant for example. The communication network 104 includes a plurality of network components required to facilitate communication between the transmission e-mail server 108 and the reception email server 110, as is known in the art. The proxy e-mail server 107 includes a temporary e-mail data store 109 and a web server 111. The web server 111 includes a browser-based Mail User Agent (MUA) that is IDN username compatible.

A sender uses a corresponding communication device 103a for transmitting an e-mail message via a MUA. The transmission e-mail server 108 includes a Mail Submission Agent (MSA) and a Simple Mail Transfer Protocol (SMTP) server.

As is known in the art, the transmission e-mail server 108 may be local to the sender's communication device 103a, connected with the sender's communication device 103a via a local network (not shown), or hosted at a remote site and connected with the sender's communication device 103a via the communication network 104.

Similar to the sender, a recipient uses a corresponding communication device 103b for displaying an e-mail message via a MUA. The reception e-mail server 110 includes a MTA, a local delivery agent, local file storage and a message retrieval server.

As is known in the art, the reception e-mail server 110 may be local to the recipient's communication device 103b, connected with the recipient's communication device 103b via a local network, or hosted at a remote site and connected with the recipient's communication device 103b via a public network such as the Internet.

The MTA is configured to receive an e-mail message from the transmission e-mail server 108 either directly, or indirectly via a plurality of intermediate MTAs. The local delivery agent is configured to persist the received e-mail message on the local storage in a directory corresponding with the username. The message retrieval server comprises one or more of a POP server, an IMAP server or a local host server, and is configured to deliver e-mail messages from the local storage 108 to the recipient for display via the MUA.

In the present embodiment, for ease of explanation only, the sender's communication device 103a and the transmission e-mail server 108 support IDN usernames while the reception e-mail server 110 and the recipient's communication device 103b do not support IDN usernames. Accordingly, if the sender were to send an e-mail message to the recipient, the recipient would not be able to respond since the IDN username could not be properly processed. The present embodiment overcomes the deficiencies at the recipient by storing the e-mail message from the sender at the proxy e-mail server 107. A notification of the e-mail message, including a location of the e-mail message on the web server 111, is sent to the recipient. The recipient can then view and reply to the e-mail message on the web server 111 via a browser.

Figure 2:
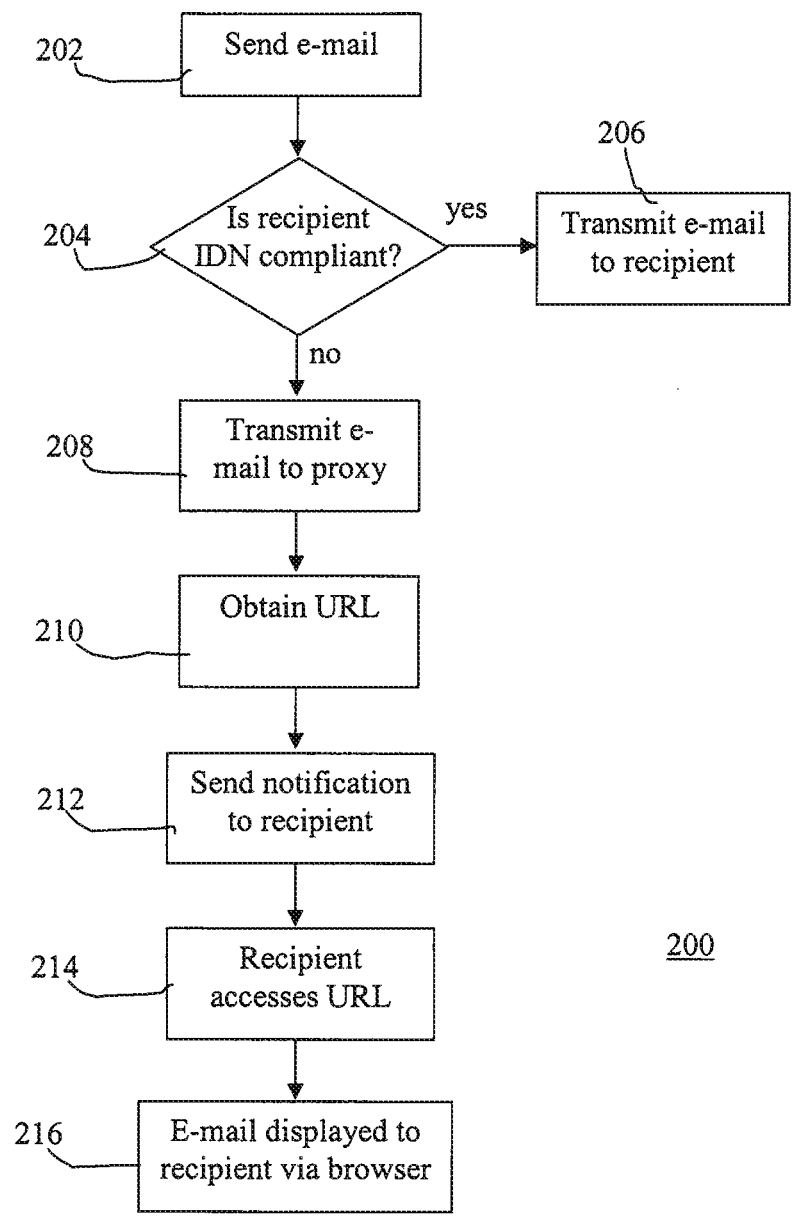
FIG. 2 is a flow chart illustrating transmission of an e-mail message.

Referring to FIG. 2, a flow chart describing the steps of transmitting the e-mail message from the sender to the recipient is illustrated generally by numeral 200. At step 202, the sender drafts a new e-mail message using a MUA that supports the IDN e-mail standard. The sender's communication device 103a then connects to the transmission e-mail server 108 and transmits the e-mail message.

At step 204, the transmission e-mail server 108 connects to the reception e-mail server 110 to determine if it is IDN e-mail complaint. If the reception e-mail server 110 is IDN username compliant, the process continues to step 206 and the transmission e-mail server 108 transmits the e-mail message. At this point the process is complete.

If the reception e-mail server 110 is not IDN username compliant, the process continues to step 208 and the e-mail message is transmitted to the proxy e-mail server 107 and stored in the stored in the temporary e-mail database 109.

At step 210, the proxy e-mail server 107 generates a uniform resource locator (URL) that can be used to access the e-mail message. In the present embodiment the URL is generated using a random URL generator. The type of random URL generator used is beyond the scope of the present invention and may include known or proprietary methods. The generated URL is transmitted to the transmission e-mail server 110.

At step 212, the transmission e-mail server 110 generates a notification message, including the URL of the e-mail message, and transmits the notification message to the reception e-mail server 110 using the standard SMTP protocol. In the present embodiment, the notification message is in the form of an e-mail, with the URL contained in the body of the e-mail message. However, other methods for sending the notification message may be used.

At step 214, the recipient's communication device 103b receives the notification message from the reception e-mail server 110. The recipient clicks on the URL contained in the notification message and, thereby, requests that the web server 111 displays the stored e-mail message.

At step 216, the web server 111 responds and sends the stored e-mail message to the recipient's browser to be displayed. The recipient can read and respond to the e-mail message using a browser-based MUA executing at the proxy e-mail server 107. In addition to being able to read and reply to the e-mail message, the recipient can also perform other mail operations such as forward the e-mail message and request that the e-mail message is delivered to the recipient's mailbox. If the latter is selected, the e-mail message is sent from the proxy e-mail server 107 to the recipient's communication device 103b via the reception e-mail server 110. However, in the present embodiment, the proxy e-mail server 107 strips the IDN username from the e-mail message and replaces it with a generic username, such as "no-reply" for example. In an alternative embodiment, the IDN username is stripped from the e-mail message and replaced with an ASCII username specified by the sender.

Accordingly, the present embodiment provides a mechanism by which a recipient can perform mail operations on an e-mail message from a sender having an IDN username even though the reception e-mail server 110 is not IDN username compliant.

Further, although the present embodiment is described with reference to a specific embodiment, variations on the implementation will be apparent to a person of ordinary skill in the art.

For example, in the embodiment described above, a single proxy e-mail server 107 is described. In one embodiment, a single proxy e-mail server 107 can be used for all transmission e-mail servers 108. Alternatively, a single proxy e-mail server 107 can be used for each transmission e-mail server 108. Yet alternatively, a plurality of proxy e-mail servers 107 can be used. The configuration of the proxy-e-mail servers 107 can vary depending on the implementation. For example, each of the proxy e-mail servers 107 can be associated with a plurality of different transmission e-mail servers 108. Alternatively, a plurality of the proxy e-mail servers 107 can be associated with a plurality of different transmission e-mail servers 108. Yet alternatively. Each of the plurality of different transmission e-mail servers 108 can be associated with a plurality of the proxy e-mail servers 107. Determining which of the proxy-servers 107 to be used can depend on the transmission e-mail server 108, the sender's communication device 103a, the sender, recipient, the recipient's communication device 103b, the reception e-mail server 110, or a combination thereof.

As another example, the embodiments described above refer to a proxy e-mail server 107 as being separate from the transmission e-mail server 108. It is possible, however, that the two servers may be implemented on the same physical machine.

As another example, the embodiments described above refer to the reception e-mail server 110 and the recipient as being non-compliant with IDN usernames. However, it is possible that the reception e-mail server 110 is IDN username compliant, but only recipient's communication device 103b is not. In this embodiment, the e-mail message may be forwarded to the proxy e-mail server 107 by either the transmission e-mail server 108 or the reception e-mail server 110, depending on the implementation.

As another example, in the embodiments described above, step 208 describes generating a random URL for sending to the recipient as part of the notification. However, in different implementations, different levels of security may be required. Accordingly, different methods for generating the URL, sending the notification and providing the user at the recipient with access to the web server 111 may be employed. In one embodiment, a password to access the web server 111 is transmitted to the recipient, either along with the notification or as a separate notification. Alternatively, the random URL can be include a non-random portion, such as the domain name of either the sender's e-mail address or the recipient's e-mail address, and a random portion. Mixing random and non-random portions of a URL may make the URL more difficult to guess. Yet alternatively, when the recipient accesses the web server 111, the recipient is prompted to establish an account having a username and a password. All subsequent e-mail messages to that recipient would require the recipient to log in using the username and password.

Further, the network traffic between the proxy e-mail server 107 can be plaintext or encrypted. A number of different known or proprietary encryption schemes, password or token authentication, and/or HTTPS can be applied to traffic between the recipient and the proxy e-mail server 107.

As another example, in the embodiments described above, step 210 describes the notification as being sent by the transmission e-mail server 108. Alternatively, the notification can be sent directly from the proxy e-mail server 107 to the reception e-mail server 110.

Using the foregoing specification, the invention may be implemented as a machine, process or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "software" and "application" as used herein are intended to encompass a computer program existent on any computer-usable medium such as on any memory device.

Examples of memory devices include, hard disk drives, diskettes, optical disks, magnetic tape, semiconductor memories such as FLASH, RAM, ROM, PROMS, and the like.

Examples of networks include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, for example, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

Although preferred embodiments of the invention have been described herein, it will be understood by those skilled in the art that variations may be made thereto and combination be made thereof without departing from the spirit of the invention or the scope of the appended claims.

The invention claimed is:

1. A method for transmitting an electronic mail (e-mail) message from a sender having a non-ASCII username to a recipient, the method comprising the steps of:
   determining whether or not the recipient is configured to receive the e-mail message having the non-ASCII username;
   if the recipient is configured to receive the e-mail message, transmitting the message to the recipient;
   if the recipient is not configured to receive the e-mail message having the non-ASCII username:
      submitting the e-mail message for storage in a data store associated with a proxy e-mail server configured for processing the non-ASCII username;
      obtaining a uniform resource locator (URL) to identify a location of the stored e-mail message; and
      transmitting a notification message to the recipient, the notification message including the URL, for subsequent use by the recipient for accessing the e-mail message upon receipt of the notification message.

2. The method of claim 1, wherein the recipient uses the URL to
   access the e-mail message on the data store associate with the proxy e-mail server via a web
   browser.

3. The method of claim 1, wherein the user can perform mail
   operations on the e-mail message.

4. The method of claim 3, wherein the mail operation is a request to send the e-mail message to the recipient, comprising the further steps removing the non-ASCII username and transmitting the message to the recipient.

5. The method of claim 4, wherein the non-ASCII username is replaced with a generic ASCII username or an ASCII username defined by the sender.

6. The method of claim 1, wherein the URL is randomly generated.

7. The method of claim 1, comprising the further step of encrypting communication when the recipient uses the URL to access the e-mail message.

8. The method of claim 1 comprising the further steps of obtaining a password associated with the URL; and transmitting the password to the recipient; wherein the password is used to validate the recipient when the recipient uses the URL to access the email message.

9. The method of claim 8, wherein the password is sent in a password notification message, which is distinct from the notification message.

10. The method of claim 1 comprising the further steps of requiring the recipient to establish an account when the recipient uses the URL to access the e-mail message; wherein further e-mail messages to the recipient are associated with the account.

11. A proxy e-mail server configured to display an e-mail message from a sender having a non-ASCII username to a recipient that cannot receive e-mail messages from senders non-ASCII usernames, the proxy e-mail server comprising:
   a data store configured to store the e-mail message from a transmission e-mail server;
   a web server capable of processing non-ASCII usernames, the web server configured to:
      generate a URL to identify a location of the e-mail message;
      transmit the URL to the recipient; and
      display the e-mail message to the recipient when the recipient accesses the URL; and
      if the recipient is not configured to receive the e-mail message having the non-ASCII username:
         submitting the e-mail message for storage in a data store associated with a proxy e-mail server configured for processing the non-ASCII username;
         obtaining a uniform resource locator (URL) to identify a location of the stored e-mail message; and
         transmitting a notification message to the recipient, the notification message including the URL, for subsequent use by the recipient for accessing the e-mail message upon receipt of the notification message.

12. The proxy e-mail server of claim 11, wherein the web server transmits the URL to the recipient either by transmitting the URL to the transmission e-mail server, which transmits the URL in a notification message to a reception e-mail server; or by transmitting the URL in a notification message directly to the reception e-mail server.

13. The proxy e-mail server of claim 11, wherein proxy e-mail server is associated with a corresponding transmission e-mail server.

14. The proxy e-mail server of claim 11, wherein proxy e-mail server is associated with a corresponding reception e-mail server.

15. The proxy e-mail server of claim 11, wherein the web server is further configured to generate a password associated with the URL; and transmitting the password to the recipient; wherein the password is used to validate the recipient when the recipient uses the URL to access the e-mail message.

16. The proxy e-mail server of claim 15, wherein the password is sent separately from the notification message.

17. The proxy e-mail server of claim 11 wherein the web server is further configured to establish an account when the recipient uses the URL to access the e-mail message; wherein further e-mail messages to the recipient are associated with the account.

18. An e-mail server configured to transmit an e-mail message from a sender having a non-ASCII username to a recipient, the e-mail server comprising:
   memory for storing instructions; and
   a processor, configured to execute the instructions to implement the steps of:
      determining whether or not the recipient is configured to receive the e-mail message having the non-ASCII username;
      if the recipient is configured to receive the e-mail message, transmitting the message to the recipient;
      if the recipient is not configured to receive the e-mail message having the non-ASCII username:
         submitting the e-mail message for storage in a data store associated with a proxy e-mail server configured for processing the non-ASCII username;
         obtaining a uniform resource locator (URL) to identify a location of the stored e-mail message; and
         transmitting a notification message to the recipient, the message notification including the URL, for subsequent use by the recipient to access the e-mail message upon receipt of the notification message.

19. The e-mail server of claim 18, wherein the e-mail server is a transmission e-mail server or a reception e-mail server.

20. A non-transitory computer readable medium having stored thereon instructions for transmitting an electronic mail (e-mail) message from a sender having a non-ASCII username to a recipient, the instructions when executed by a processor cause the processor to implement the steps of:
   determining whether or not the recipient is configured to receive the e-mail message having the non-ASCII username;
   if the recipient is configured to receive the e-mail message, transmitting the message to the recipient;
   if the recipient is not configured to receive the e-mail message having the non-ASCII username:
      submitting the e-mail message for storage in a data store associated with a proxy e-mail server configured for processing the non-ASCII username;
      obtaining a uniform resource locator (URL) to identify a location of the stored e-mail message; and
      transmitting a notification message to the recipient, the notification message including the URL, for subsequent use in accessing the e-mail message.

* * * * *